United States Patent [19]

Steeby et al.

[11] Patent Number: 5,408,898
[45] Date of Patent: Apr. 25, 1995

[54] PRESELECT SHIFT STRATEGY USING STORED ENERGY

[75] Inventors: Jon A. Steeby, Schoolcraft; Mykolas J. Balanda, Kalamazoo, both of Mich.

[73] Assignee: Eaton Corporation, Cleveland, Ohio

[21] Appl. No.: 150,672

[22] Filed: Nov. 10, 1993

[51] Int. Cl.⁶ .............................................. F16H 59/04
[52] U.S. Cl. .................................................. 74/473 R
[58] Field of Search ................... 74/473 R; 192/109 A

[56] References Cited

U.S. PATENT DOCUMENTS

| Re. 31,296 | 7/1983 | Richards | 74/339 |
| 4,567,785 | 2/1986 | Reynolds et al. | 74/477 |
| 4,873,881 | 10/1989 | Edelen et al. | 74/336 |
| 4,899,607 | 2/1990 | Stainton | 74/335 |

Primary Examiner—Charles A. Marmor
Assistant Examiner—Troy Grabow
Attorney, Agent, or Firm—L. J. Kasper; Howard D. Gordon

[57] ABSTRACT

A shifting mechanism (25) is disclosed for shifting a shift rail (11) in a transverse (Y—Y) direction. The mechanism includes a shift finger (23) movable in both the transverse and axial (X—X) directions. The shift rail (11) defines a first blocker surface (59), and axially adjacent thereto a recess (63) in which is disposed a compression spring (71). When the shift finger (23) is positioned in a first axial position (FIG. 6), the shift finger engages the spring (71), and movement of the shift finger in the first transverse direction preloads the spring before the shift rail moves in the first transverse direction. In a second axial position (FIG. 9), the shift finger engages the first blocker surface (59), whereby movement of the shift finger in the first transverse direction results in corresponding movement of the shift rail in the first transverse direction.

9 Claims, 4 Drawing Sheets

PRESELECT SHIFT STRATEGY USING STORED ENERGY

BACKGROUND OF THE DISCLOSURE

The present invention relates to a shifting mechanism of the "X-Y" type for use with a shift bar housing assembly of a mechanical change-gear transmission, and more particularly, to such a mechanism of the type which is automatically or semi-automatically shifted, on a transmission which otherwise would be, or could be, manually shifted.

Shift bar housing assemblies for mechanical change-gear transmissions usually comprise a plurality of generally parallel, independently transversely movable shift bars, which are to be selected, and moved transversely, to effect engagement/disengagement of a particular gear ratio. Such shift-bar housing assemblies are well known to those skilled in the art, as may be seen by reference to U.S. Pat. Nos. 2,951,392; 4,567,785; and 4,873,881, all of which are assigned to the assignee of the present invention and incorporated herein by reference.

Typically, such shift bar housing assemblies have been manually controlled, and operated by a shift finger fixed to a directly mounted shift lever, or to the cross-shaft of a remotely controlled shifting mechanism. Automatic and semi-automatic mechanical transmissions, based upon generally standard mechanical transmissions, but provided with electric or pneumatic actuators, are now well known in the prior art, as may be seen by reference to U.S. Pat. Nos. 4,361,060 and 4,648,290, the latter of which is assigned to the assignee of the present invention, and both are incorporated herein by reference.

Also now well known in the prior art are automatically controlled "X-Y" type shifting mechanisms, wherein a shift finger is automatically moved in the axial (X—X) or rail selection direction, and then in the transverse (Y—Y) or gear engagement/disengagement direction. It will be understood by those skilled in the art that reference herein to the "transverse" and "axial" directions pertains to the shifter, and does not necessarily imply any particular direction on either the transmission or the vehicle. Also known are single shaft shifting mechanisms, as may be seen by reference to U.S. Pat. No. 4,920,815, which is assigned to the assignee of the present invention, and the disclosure of which is incorporated herein by reference.

Frequently, such an automatic or semi-automatic X-Y shifting mechanism is applied to a non-synchronous mechanical change-gear transmission. As used herein, the term "non-synchronous" will be understood to refer to a mechanical change-gear transmission of the type not equipped with synchronizers (or with less than extremely accurate synchronizers).

In a typical X-Y shifting mechanism, there is a strategy for gear preselection which involves applying a preload force (e.g., 20 to 40 lbs.) to the sliding clutch, but which lets the clutch remain "in gear" (the gear-engaged position) until a torque break or reversal occurs, at which point the clutch moves from the "in gear" position to "out of gear" (the gear-disengaged position).

Although shifting mechanisms of the type described above have been generally acceptable, and their operation generally satisfactory, there are certain disadvantages associated with such shifting mechanisms. A primary problem is that such shifting mechanisms require a substantial amount of control logic in order to achieve the proper timing of the various shifting operations, and the desired shift response. Such control logic adds substantially to the cost and complexity of the overall shifting mechanism.

SUMMARY OF THE INVENTION

Accordingly, it is an object of the present invention to provide an improved shifting mechanism of the type described above, which is capable of maintaining a nearly constant force on the clutch, as the clutch is being shifted from the gear-engaged position to the gear-disengaged position.

It is a more specific object of the present invention to provide such a shifting mechanism, which accomplishes the above-stated object, by preloading an energy-storage device, which then assists in moving the shift rail from its in-gear position to its neutral (out of gear) position upon the occurrence of a torque break or reversal.

It is a further object of the present invention to provide such a shifting mechanism, which accomplishes the above-stated objects, but which still has the capability of solid engagement between the shift finger and a blocker surface of the shift rail.

The above and other objects of the invention are accomplished by the provision of a shifting mechanism for controlling the shifting of change gears of a mechanical change-gear transmission of the type having at least one shift rail movable in a first (Y—Y) transverse direction from a gear-disengaged position to a first gear-engaged position. The shifting mechanism comprises a shift finger assembly including a shift finger movable in the first (Y—Y) transverse direction, and movable in an axial (X—X) direction. The shift rail defines a first blocker surface whereby, when the shift finger is in engagement with the first blocker surface, and moves in the first (Y—Y) transverse direction, the shift rail moves in the first (Y—Y) transverse direction.

The improved shifting mechanism is characterized by a first energy-storage means is disposed axially adjacent the first blocker surface, and is pre-loadable in the first (Y—Y) transverse direction. The shift finger is axially movable between first and second axial positions, whereby:

(i) in the first axial position, the shift finger is in engagement with the first energy-storage means, and movement of the shift finger in the first (Y—Y) transverse direction pre-loads the first energy-storage means before the shift rail moves in the first (Y—Y) transverse direction; and (ii) in the second axial position, the shift finger is in engagement with the first blocker surface, whereby movement of the shift finger in the first (Y—Y) transverse direction results in corresponding movement of the shift rail in the first transverse direction.

DESCRIPTION OF THE PREFERRED EMBODIMENT

In this disclosure, certain terminology will be used for convenience, in reference only, and will not be limiting. For example, the term "axial" is used hereinafter in conjunction with movement in the X—X direction, whereas the term "transverse" is used in conjunction with movement in the Y—Y direction. It will be understood that neither term is intended to be limiting, but such terms are used only for ease of explanation.

Mechanical change-gear transmissions are well known in the art, as may be seen by reference to U.S. Pat. No. 3,105,395, assigned to the assignee of the present invention and incorporated herein by reference. Remote controls for shifting transmissions of this type are well known in the art, as may be seen by reference to U.S. Pat. No. 4,104,928 which is assigned to the assignee of the present invention and incorporated herein by reference.

Such transmissions typically include a shift bar housing assembly of the type which is now well known to those skilled in the art, and is illustrated and described in greater detail in U.S. Pat. No. 4,455,883, assigned to the assignee of the present invention and incorporated herein by reference. As may be seen by reference to FIG. 2, such a shift bar housing assembly typically comprises a plurality of substantially parallel, spaced-apart, transversely movable shift rails 11, 13, and 15, which carry shift forks 17, 19, and 21, respectively, the shift forks being shown only fragmentarily in FIG. 2. Each of the shift forks is associated with a positive clutch mechanism, such as a jaw clutch, for selectively engaging/disengaging one or the other of a pair of gears to a shaft.

Figure 2:
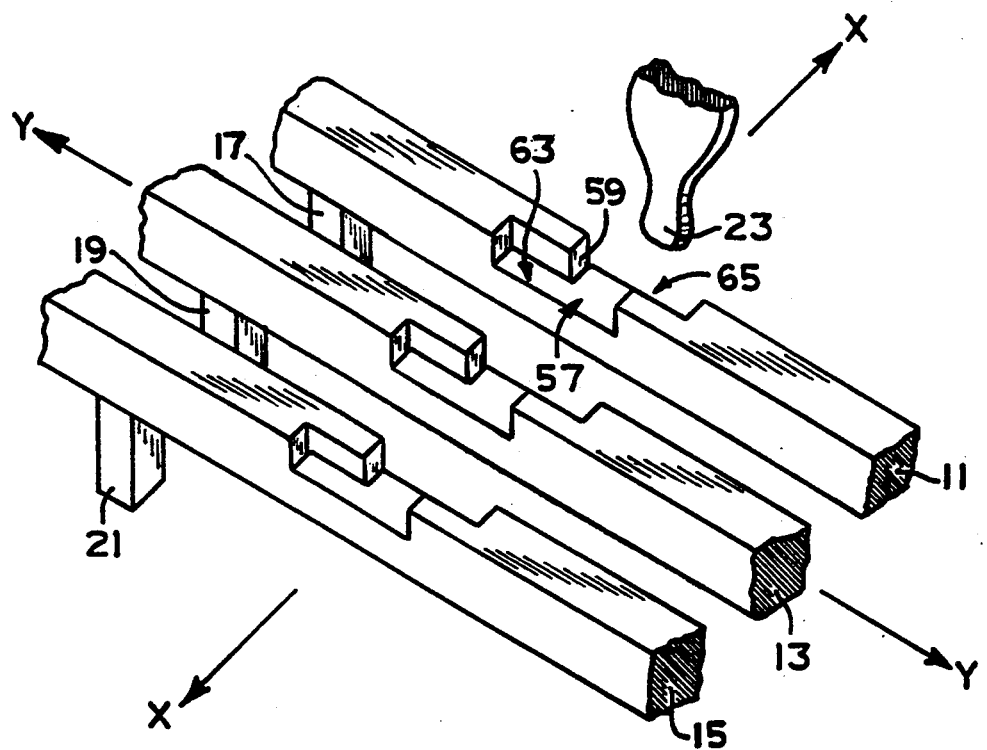
FIG. 2 is a somewhat simplified, perspective view of a series of shift rails made in accordance with the present invention, but excluding the springs.

Typically, shifting of such transmissions is accomplished by selecting one of the shift rails 11, 13, or 15, by moving a shift finger 23 in the axial (X—X) direction, into alignment with a notch defined by the selected shift rail. Shifting is completed by then causing transverse movement of the selected shift rail, typically by pivoting the shift finger to apply a transverse force thereto in the Y—Y direction. Alternatively, and also within the scope of the present invention, shifting could be accomplished by means of the single shaft arrangement of the type shown in above-incorporated U.S. Pat. No. 4,920,815. It should be understood by those skilled in the art that the present invention is not limited to any particular shift rail arrangement, and that FIG. 2 is included primarily to facilitate an understanding of the shifting mechanism to be described subsequently.

Figure 1:
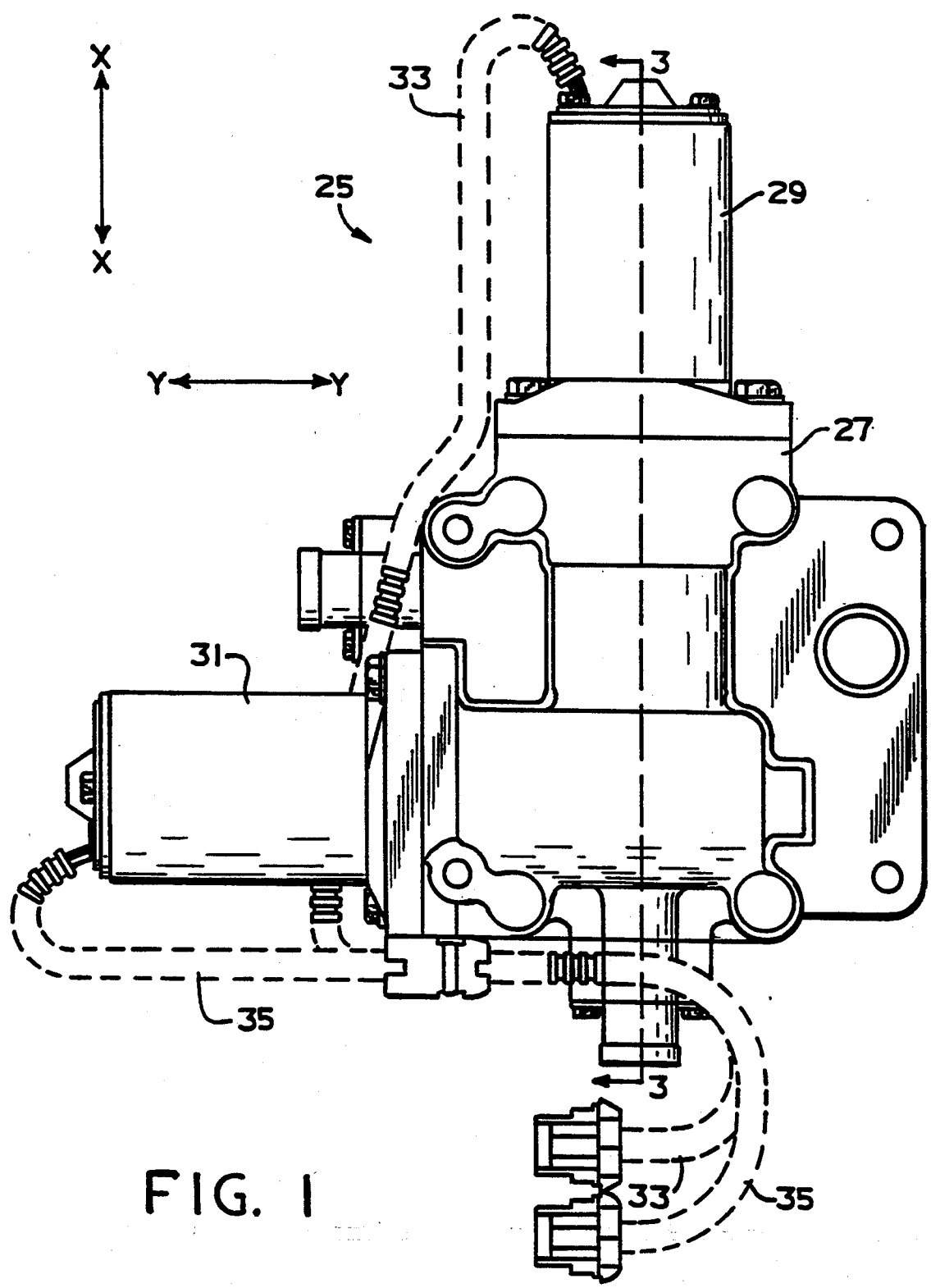
FIG. 1 is a top plan view of an X-Y shifting mechanism of the type to which the present invention relates.

Referring now primarily to FIG. 1, the shifting mechanism of the present invention, generally designated 25, includes a housing 27 that is mountable upon a mechanical change-gear transmission and shift bar housing (neither of which is shown herein). The mechanism 25 includes an electric motor 29, mounted to the housing 27, which is operable to move the shift finger 23 in the axial (X—X) direction. The mechanism 25 also has an electric motor 31, also mounted to the housing 27, which is operable to move the shift finger 23 in the transverse (Y—Y) direction. The movement of the shift finger 23 in both the X—X and the Y—Y directions will be described in greater detail subsequently, primarily in conjunction with both FIGS. 1 and 3.

Electric motors 29 and 31 are powered by a suitable power source, carried by the vehicle, such as the vehicle battery (not shown herein). The shifting mechanism 25 is controlled by suitable electrical circuitry (also not shown herein) which is now well known to those skilled in the art. The circuitry is operable to receive and process a gear shift selection signal, and to receive and process a speed signal, then energize the electric motor 29 to cause it to move the shift finger 23 in the X—X direction, into engagement with the shift rail to be selected, as appropriate, and then to energize the electric motor 31 to pivot the shift finger 23 in the Y—Y direction, to effect the gear engagement or disengagement, as appropriate. The electric motors 29 and 31 are energized by means of a pair of electrical cables 33 and 35, respectively.

Figure 3:
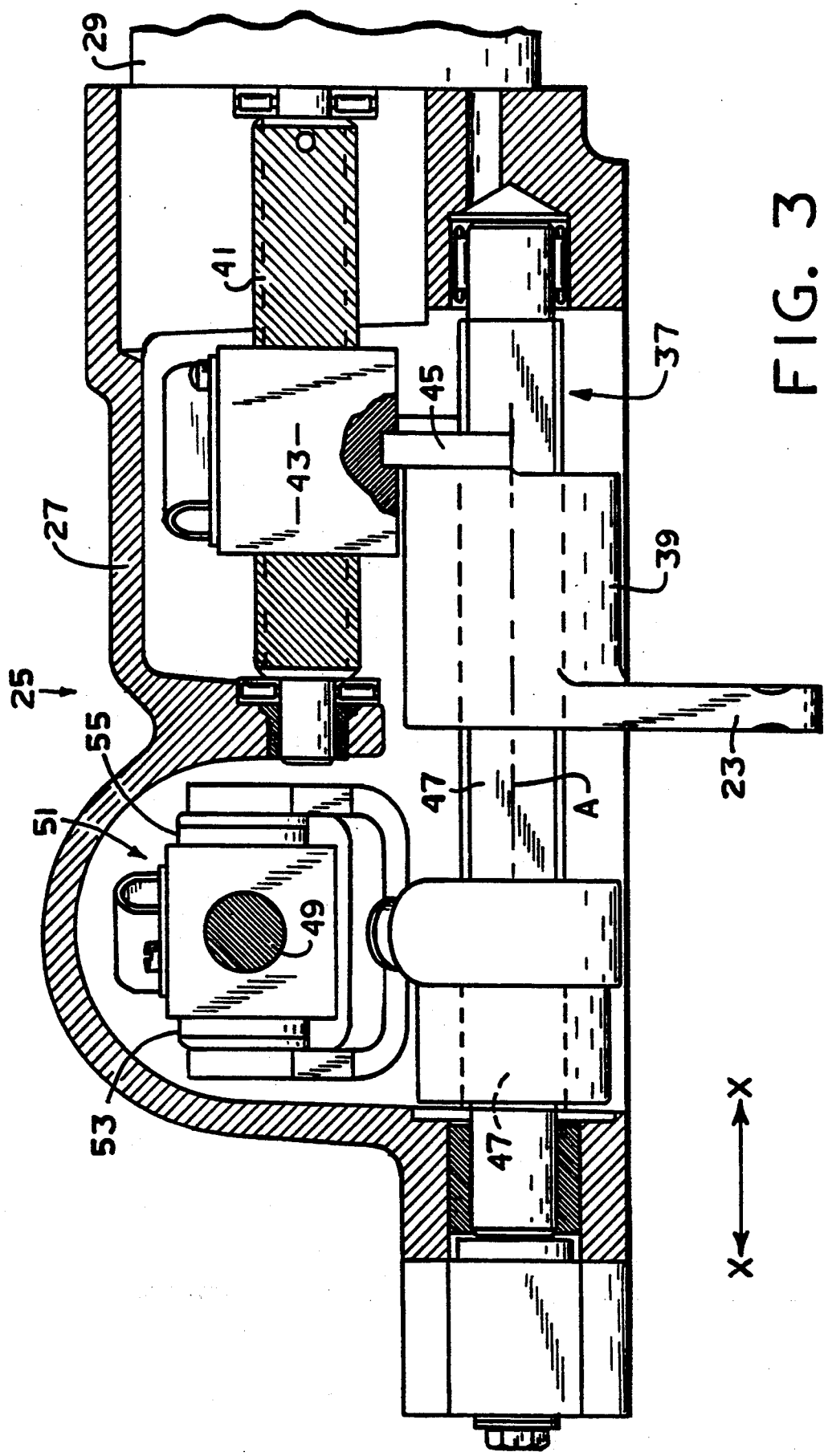
FIG. 3 is an axial cross-section, taken on line 3—3 of FIG. 1, and on a larger scale than FIG. 1.

Referring now primarily to FIG. 3, the shifting mechanism 25 is of the general type illustrated and described in greater detail in above-incorporated U.S. Pat. No. 4,873,881. A first shaft member, generally designated 37, is rotatably mounted within the housing 27 about its axis of rotation, with the opposite ends of the shaft 37 received within, and rotatably supported by the housing 27. A shift finger carrier member 39 is disposed co-axially on the shaft 37. The carrier member 39 is operable to move in opposite axial (X—X) directions along the shaft 37, as well as being able to rotate about the axis A of the shaft 37. In the subject embodiment, the shift finger 23 is formed integrally with the carrier member 39 for movement therewith in both the axial (X—X) and transverse (Y—Y) directions.

A second shaft member 41 is drivingly connected to the electric motor 29 at its right end in FIG. 3, and at its left end, the shaft 41 is journalled for rotation relative to the housing 27. The second shaft member 41 rotates about an axis of rotation which is, preferably, substantially parallel to the axis of rotation of the first shaft member 37. In the subject embodiment, the axes of rotation of the shaft members 37 and 41 both lie in the plane of FIG. 3.

The second shaft member 41 is externally threaded, and a first threaded traversing member 43 is in threaded engagement with the external threads of the shaft 41, and operable to traverse in opposite axial (X—X) directions along the shaft 41, as the shaft 41 is rotated by the electric motor 29. The shaft member 41 and traversing member 43 together comprise a recirculating ball screw mechanism of the type which is generally well known to those skilled in the art, and will not be described in detail herein. At the right end in FIG. 3 of the shift finger carrier member 39 is an annular portion or shoulder 45 which is received within an arcuate groove on the underside of the traversing member 43, such that traversing movement of the member 43 results in axial movement of the carrier member 39 along the axis of the shaft 37. The first shaft member 37 includes a generally central portion 47, disposed to the left (in FIG. 3) of the carrier member 39. The central portion 47 of the shaft 37 has a generally square cross-section (but preferably with rounded corners) and extends into the shift finger carrier member 39. The purpose of the central shaft portion 47 being generally square is to enable the carrier member 39 to move in the axial (X—X) direction along the shaft portion 47, while being rotatable with the shaft portion 47 whenever the first shaft member 37 is rotated about its axis.

For purposes of subsequent description, it will be assumed that the electric motor 29 has been energized, rotating the second shaft member 41 in the appropriate direction to cause traverse movement of the traversing member 43. Such movement of the member 43 results in corresponding movement of the shoulder 45 and the shift finger carrier member 39, thus positioning the shift finger 23 in the appropriate axial (X—X) direction, in preparation for shifting whichever of the shift rails 11, 13, or 15, is to be shifted.

Referring still to FIG. 3, the mechanism for moving the shift finger 23 in the transverse (Y—Y) direction will be described. A third shaft member 49 is drivingly connected to the electric motor 31, with one end of the shaft member 49 being journalled within the housing 27. The third shaft member 49 is externally threaded in the same manner as the second shaft member 41, and a second threaded traversing member 51 is in threaded engagement with the third shaft member 49, in the same way as the traversing member 43 is with the shaft member 41. However, because the third shaft member 49 rotates about an axis of rotation which lies perpendicular to the plane of FIG. 3, the traversing member 51 is operable to traverse in opposite transverse (Y—Y) directions along the shaft member 49 in response to the electric motor 31 rotating the shaft member 49.

The second traversing member 51 differs from the first traversing member 43 in that it is provided with first and second trunnion members 53 and 55, disposed on opposite axial sides of the traversing member 51, the function of the trunnion members 53 and 55 being to translate rotation of the shaft member 49 into pivotal movement of a yoke assembly 56. Pivotal movement of the yoke assembly 56 in turn results in rotation of the first shaft member 37, and the shift finger carrier member 39, and pivotal movement of the shift finger 23.

It should be understood that the shifting mechanism of the present invention is not limited to any particular actuator arrangement, and that the particular actuator arrangement illustrated in FIGS. 1 and 3 is by way of example only.

Figure 4:
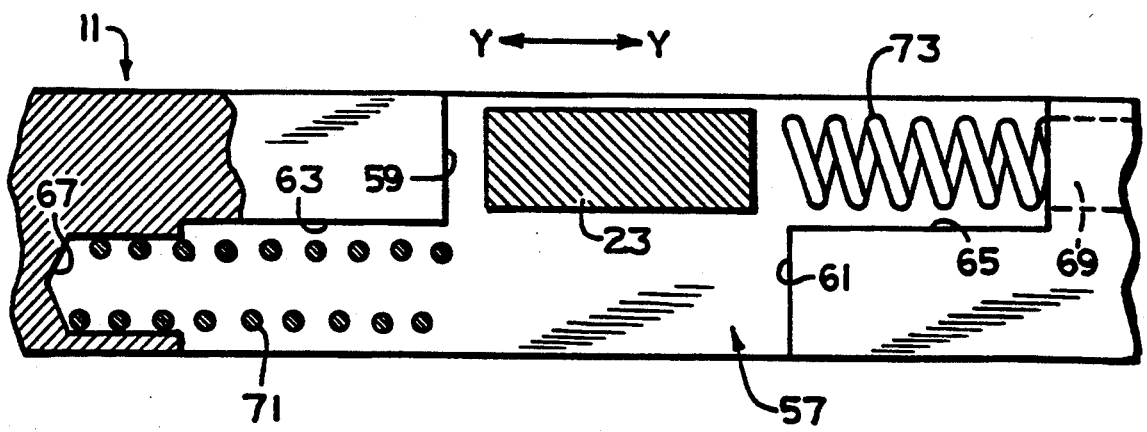
FIG. 4 is a top plan view, partly broken away, of one of the shift rails shown in FIG. 2, on a substantially larger scale than FIG. 2, and including the shift finger, and the springs.

Referring now primarily to FIGS. 2 and 4, the shift rail 11 will be described in greater detail, it being understood that, preferably, all three of the shift rails 11, 13, and 15 are substantially identical, although the invention is not so limited. As is well known to those skilled in the art, a typical shift rail of the type to which the invention relates, defines a notch through which the shift finger can pass, and on each transverse side of the notch (in the Y—Y direction), the shift rail defines a blocker surface. Movement of the shift rail in the transverse direction (Y—Y) is accomplished by moving the shift finger into the notch, then into engagement with the adjacent blocker surface, and thereafter, transverse movement of the shift finger results in transverse movement of the shift rail.

The shift rail 11 defines a notch, generally designated 57. With the shift finger 23 in the position shown in FIG. 2, if it were desired to actuate the gear associated with the shift rail 13, the shift finger 23 would be moved axially (X—X) through the notch 57 without touching the shift rail 11, until the shift finger would be correctly positioned to move the shift rail 13.

Disposed transversely on either side of the notch 57, the shift rail defines a first blocker surface 59 and a second blocker surface 61 (shown only in FIG. 4). Disposed adjacent (in the X—X direction) the first blocker surface 59 is a first recess 63 (see FIG. 2), and similarly, adjacent the second blocker surface 61 is a second recess 65. Adjacent the first recess 63, the shift rail 11 defines a first coarsely threaded opening 67, and transversely adjacent the second recess, the shift rail defines a second coarsely threaded opening 69 (shown only in dotted form in FIG. 4).

A first coiled compression spring 71 is threaded into the threaded opening 67, while a second coiled compression spring 73 is threaded into the threaded opening 69. Although the springs 71 and 73 obviously don't include true "threads", it is believed that those skilled in the art will understand the use of threaded openings as a means of retaining the springs 71 and 73, so that the transversely outer end of each spring is retained (in the Y—Y direction) relative to the shift rail. It will be understood from the subsequent description that the retention of the springs 71 and 73 relative to the shift rail does not have to be "permanent", such that the spring can never be disassembled from the shift rail, but instead, it is merely necessary that the "fixed" end of each of the springs is not movable relative to the shift rail during operation of the shifting mechanism, which will be described subsequently. By way of example only, the springs 71 and 73 could be retained within their respective openings by any suitable fastener, such as a roll pin, or some sort of clip member which would engage or separate adjacent turns of the spring.

OPERATION

Referring now primarily to FIGS. 5 through 9, the operation of the present invention will be described in some detail. In describing the operation, it will be assumed that the shift rail 11 is operable to select either first gear or second gear, with first gear being selected by movement of the shift rail to the left in FIGS. 2 and 4 (upward in FIGS. 5 through 9), and second gear being selected by movement of the shift rail to the right in FIGS. 2 and 4 (downward in FIGS. 5 through 9).

Figure 5:
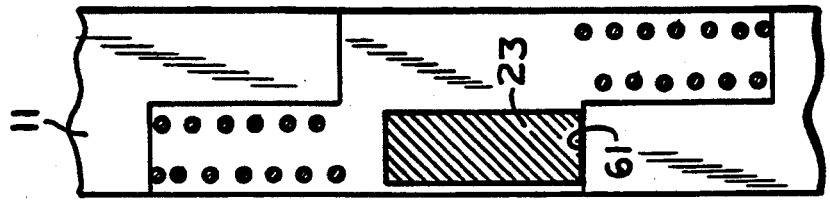

In FIG. 5, the shift rail 11 is shifted downward, selecting second gear, with the shift finger 23 in solid engagement with the blocker surface 61. Assuming that it is now desired to move the shift rail from the gear-engaged to the gear-disengaged position, the shift finger 23 is moved upward, into engagement with the first spring 71. As the shift finger 23 continues to move upward (see FIG. 6), it reaches its "neutral" position, substantially compressing the spring 71, but with the shift rail 11 still in the gear-engaged (second gear) position.

Figure 7:
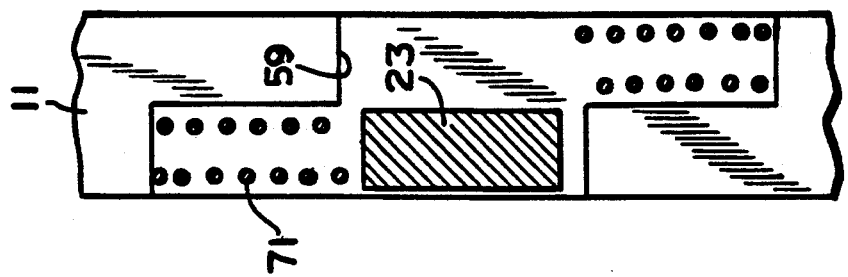
Figure 6:
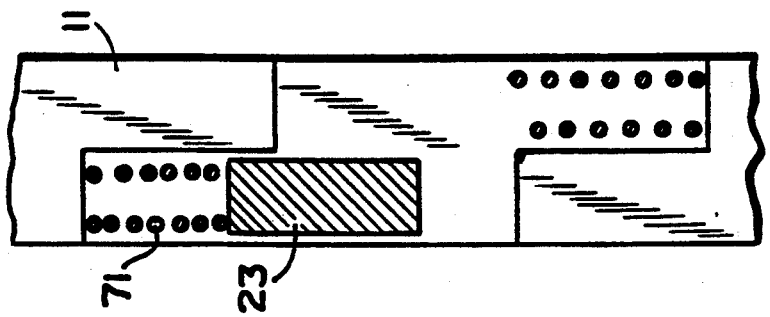

As a torque break or torque reversal occurs, the energy which has been stored by the spring 71 while it is compressed, causes the shift rail 11 to move quickly from the gear-engaged position of FIGS. 5 and 6 to the gear-disengaged (neutral) position of FIG. 7. When it is desired subsequently to move the shift rail 11 from the gear-disengaged (neutral) position of FIG. 7 to an opposite gear-engaged (first gear) position, the first step is to move the shift finger 23 from the axial position shown in FIG. 7, adjacent the spring 71, to the axial position shown in FIG. 8, with the shift finger 23 disposed adjacent the first blocker surface 59. As is well known to those skilled in the art, in prior art shifting mechanisms of the type illustrated and described herein, the shift finger would have one axial position (in the X—X direction) for each shift rail. It is a unique feature of the present invention that the shift finger 23 has two distinct axial positions for each shift rail. Therefore, for the arrangement shown in FIG. 2, with three shift rails 11, 13, and 15, the shift finger 23 would have six discrete positions. It is believed to be within the ability of those skilled in the art to control the movement of the shift finger in the axial (X—X) direction to accomplish the appropriate positioning of the shift finger.

Figure 9:
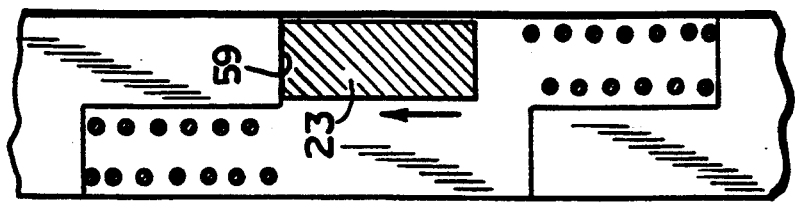
FIGS. 5-9 are somewhat schematic views of the shift rail of FIG. 4, illustrating various operating positions of the shift finger and the shift rail.
Figure 8:
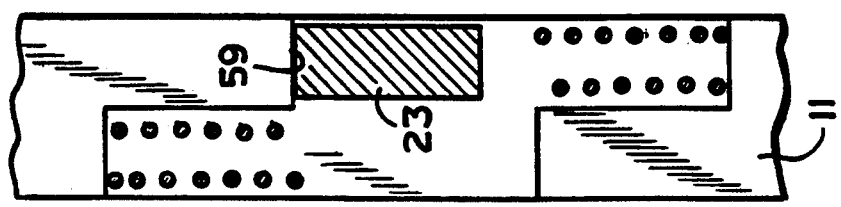

In order to move the shift rail 11 from the gear-disengaged (neutral) position of FIG. 8, to the gear-engaged (first gear) position of FIG. 9, the shift finger 23 is moved in a transverse (Y—Y) direction (see arrow in FIG. 9), while in engagement with the first blocker surface 59.

As was described above in connection with the operation of the present invention, the primary function of the springs 71 and 73 is to serve as an "energy storage means". In other words, the function of the springs is to store energy (for example, in the FIG. 6 position) in preparation for moving the shift rail from a gear-engaged position to a gear-disengaged position. The object is sufficient storage of energy that, upon a torque break or torque reversal, the energy storage means will exert enough force on the shift rail, and be able to maintain that force over a brief time period, to move the shift rail quickly to the gear-disengaged position within the available "window of time". It is believed to be within the ability of those skilled in the art to select the springs 71 and 73 such that the intended function is accomplished. As may be seen from FIGS. 6 and 7, it is an essential feature of the invention that the "energy storage means" have the capability of being "preloadable". In other words, in FIG. 6 the spring 71 is compressed (stores energy) before the movement of the shift rail 11 toward the neutral position shown in FIG. 7.

Although other forms of energy storage means could be used, in place of the springs 71 and 73, the springs are typically preferred because of the resulting simplicity and low cost of the overall arrangement, as well as the ease of assembly thereof.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A shifting mechanism for controlling the shifting of change gears of a mechanical change-gear transmission of the type having at least one shift rail movable in a first transverse direction from a gear-disengaged position to a first gear-engaged position; said shifting mechanism comprising a shift finger assembly including a shift finger movable in said first transverse direction, and movable in an axial direction; said shift rail defining a first blocker surface whereby, when said shift finger is in engagement with said first blocker surface and moves in said first transverse direction, said shift rail moves in said first transverse direction; characterized by:
   (a) first energy-storage means disposed axially adjacent said first blocker surface and being pre-loadable in said first transverse direction;
   (b) said shift finger being axially movable between first and second axial positions, whereby:
      (i) in said first axial position, said shift finger is in engagement with said first energy-storage means, and movement of said shift finger in said first transverse direction pre-loads said first energy-storage means before said shift rail moves in said first transverse direction; and
      (ii) in said second axial position, said shift finger is in engagement with said first blocker surface, whereby movement of said shift finger in said first transverse direction results in corresponding movement of said shift rail in said first transverse direction.

2. A shifting mechanism as claimed in claim 1, characterized by said shift rail being movable in a second transverse direction from said gear-disengaged position to a second gear-engaged position.

3. A shifting mechanism as claimed in claim 2, characterized by said shift finger being movable in said second transverse direction, and said shift rail defining a second blocker surface whereby, when said shift finger is in engagement with said second blocker surface and moves in said second transverse direction, said shift rail moves in said second transverse direction.

4. A shifting mechanism as claimed in claim 3, characterized by said shift rail including second energy-storage means disposed axially adjacent said second blocker surface and being pre-loadable in said second transverse direction.

5. A shifting mechanism as claimed in claim 4, characterized by, in one of said first and second axial positions, said shift finger is in engagement with said second blocker surface, and in the other of said first and second axial positions, said shift finger is in engagement with said second energy-storage means, and movement of said shift finger in said second transverse direction pre-loads said second energy-storage means before said shift rail moves in said second transverse direction.

6. A shifting mechanism as claimed in claim 4, characterized by said shift rail defining a first recess disposed axially adjacent said first blocker surface, and defining a second recess disposed axially adjacent said second blocker surface, said first energy storage means being disposed in said first recess, and said second energy storage means being disposed in said second recess.

7. A shifting mechanism as claimed in claim 6, characterized by said first and second energy storage means comprising first and second compression spring members, respectively, disposed in said first and second recesses, respectively.

8. A shifting mechanism as claimed in claim 7, characterized by said first and said second recesses cooperating with said shift rail to define first and second means operable to restrain movement of said first and said second compression spring members, respectively, in said transverse direction.

9. A method of shifting a shift rail movable in a transverse direction from one gear-engaged position to another gear-engaged position, characterized by:
   (a) providing said shift rail with a first blocker surface, and first energy-storage means disposed axially adjacent said first blocker surface;
   (b) providing a shift finger in a first axial position and moving said shift finger in said first transverse direction to preload said first energy-storage means prior to movement of said shift rail out of said one gear-engaged position;
   (c) permitting said shift rail to move from said one gear-engaged position to a gear-disengaged position in response to the bias of said first energy-storage means;
   (d) moving said shift finger in an axial direction from said first axial position to a second axial position in engagement with said first blocker surface; and
   (e) moving said shift finger in said transverse direction to move said shift rail to said another gear-engaged position.

* * * * *